United States Patent [19]

Hart et al.

[11] Patent Number: 4,666,166

[45] Date of Patent: May 19, 1987

[54] CLAMPING ARRANGEMENT FOR DIAPHRAGM-TYPE PISTON

[75] Inventors: James E. Hart, Trafford; Michael T. Zoric, N. Versailles; Allen W. Kyllonen, Plum, all of Pa.

[73] Assignee: American Standard Inc., Wilmerding, Pa.

[21] Appl. No.: 670,452

[22] Filed: Nov. 13, 1984

[51] Int. Cl.$^4$ .............................. F16J 3/02; F16J 3/06
[52] U.S. Cl. .................................. 277/212 FB; 92/96; 92/99; 137/510; 403/50
[58] Field of Search ................. 277/28, 191, 190, 181, 277/212 FB, 157, 158, 146, 145, 144, 186, 188 R, 189, 88, 89, 187, 95; 74/18, 18.1, 18.2; 403/50, 51; 92/92, 93, 94, 96, 99, 100, 105; 137/510, 859

[56] References Cited

U.S. PATENT DOCUMENTS

| | | | |
|---|---|---|---|
| 2,264,413 | 12/1941 | Siegerist | 277/187 X |
| 2,939,485 | 6/1960 | Nauheimer | 403/50 X |
| 3,148,596 | 9/1964 | Pagano, Sr. | 277/145 X |
| 3,313,552 | 4/1967 | McElya et al. | 277/95 |
| 3,424,011 | 1/1969 | Pontis | 74/18.1 |
| 3,476,398 | 11/1969 | Schanz | 277/207 X |
| 3,615,098 | 10/1971 | Sugahara | 277/143 |
| 3,630,532 | 12/1971 | Traub et al. | 277/144 |
| 3,721,127 | 3/1973 | Garcea | 92/99 |
| 4,422,650 | 12/1983 | Reinsma et al. | 277/88 |

Primary Examiner—Allan N. Shoap
Attorney, Agent, or Firm—G. J. Falce

[57] ABSTRACT

A diaphragm-clamping arrangement, in which a spring washer having a frusto-conical shape is employed between the outer periphery of the diaphragm and one of the plate members between which the diaphragm is secured. In the free state of the spring washer, the spring washer height is greater than the space between the diaphragm and one plate member so that, when the plate members are joined together, the spring washer is compressed to thereby exert a clamping force on the diaphragm. The diaphragm-clamping point can be provided by either the inner or outer periphery of the spring washer, depending upon whether the frusto-conical shape is concave or convex. By forming an annular recess in the plate member with which the spring is engageable, proper location of the spring washer is facilitated during assembly, and subsequently maintained during clamping.

15 Claims, 7 Drawing Figures

PRIOR ART

CLAMPING ARRANGEMENT FOR DIAPHRAGM-TYPE PISTON

BACKGROUND OF THE INVENTION

The present invention is directed to a diaphragm-clamping device which is particularly useful in clamping the periphery of a diaphragm-type piston between adjoining plate members, such as the plate members employed in laminated valve assemblies.

Present practice utilizes a diaphragm clamping bead (a) that is formed in a groove (b) in the face of at least one plate member (c), as represented in FIG. 1 of the drawing. The crest of this bead (a) is dimensioned to be slightly below the face of plate member (c) to permit simple machining of the plate surface without interference with the clamping bead. Tight machining tolerances are required on this clamping bead. Typically, the thickness of diaphragm (d) is on the order of 0.060 inch, which has been found to provide both flexibility and strength within acceptable standards. With a standard-type gasket (e) between the adjoining plate members (c, f), the periphery (g) of the diaphragm (d) is compressed between the clamping bead (a) of plate member (c) and the face of the adjoining plate member (f) to 0.030±0.002 inch. It will be appreciated, therefore, that the diaphragm (d) is reduced to approximately one-half its original thickness at the point of clamping. This pinching of the gasket between the clamping bead (a) and adjoining plate (c) is sufficient to normally prevent the periphery of diaphragm (d) from being pulled out of its clamped position between the adjoining plate members. In addition, the periphery of diaphragm (d) is normally formed with an enlarged end (h), so that, even if the diaphragm (d) should take a set, so as to lose its tension where it is clamped in position, the enlarged end of the diaphragm is prevented from being pulled through the reduced area between the clamping bead (a) and the adjoining plate member (c).

In certain applications, however, a new, high-pressure gasket is required, such as that disclosed in U.S. patent application Ser. No. 375,908, filed May 7, 1982, and assigned to the assignee of the present invention. This high-pressure gasket is relatively thick prior to compression and, following sufficient compression to achieve the desired high unit load sealing forces, measures approximately 0.060 inch in thickness. Thus, the distance between the clamping bead and adjoining plate member, when using such a high-pressure sealing gasket, is increased such as to preclude obtaining a sufficient clamping force on a standard-type diaphragm. This problem could be overcome by increasing the height of the clamping bead, but this solution would raise the crest of the clamping bead above the face of the plate member and, therefore, interfere with machining operations on the face of the plate member having the clamping bead.

SUMMARY OF THE INVENTION

It is, therefore, an object of this invention to provide a diaphragm-clamping device separate from the adjoining plate members between which a diaphragm is to be clamped.

It is an extension of the foregoing object to provide this separate clamping device in the form of a spring washer.

A further object of the invention is to prevent loss of clamping force due to diaphragm material set.

Another object of the invention is to utilize the clamping device to locate and maintain the position of a diaphragm piston during assembly.

Still another object of the invention is to design the diaphragm to provide a pressure seal around the clamping device when the diaphragm is clamped in place.

Briefly, these objectives are accomplished by providing a frusto-conical-shaped spring washer between the periphery of a diaphragm-type piston and a diaphragm clamping face of a first one of the adjoining plate members between which the diaphragm piston is clamped. The free height of the spring washer relative to the clamping space between the diaphragm and clamping face of the first plate member is such that the spring washer is deflected under compression when the adjoining plate members are brought together. The resultant tension of the spring washer exerts a continuous clamping force on the diaphragm to clamp the diaphragm in place against the clamping face of the first plate member and to maintain a clamping force, as the diaphragm tends to take a set over an extended period of time.

The spring washer serves the purpose of the conventional clamping bead, so that no clamping bead is required. The absence of a clamping bead simplifies machining of the face of the plate members. Being separate from the plate members, a spring washer can be selected to provide the desired diaphragm clamping force, depending upon the diaphragm/gasket size combination in use. Moreover, an annular recess can be formed in the diaphragm clamping face of a second one of the adjoining plate members to receive one end of the spring washer in order to locate and maintain proper alignment of the spring washer and diaphragm piston during assembly of the adjoining plate members.

Finally, the diaphragm periphery can be formed with an enlarged end, which is compressed between the diaphragm clamping faces of the adjoining plate members to provide a fluid pressure seal between the spring washer and the second one of the adjoining plate members.

BRIEF DESCRIPTION OF THE DRAWINGS

These and other objects and advantages of the invention will become apparent from the following more detailed explanation of the invention with reference to the accompanying drawings in which.

DESCRIPTION AND OPERATION

Figure 1:
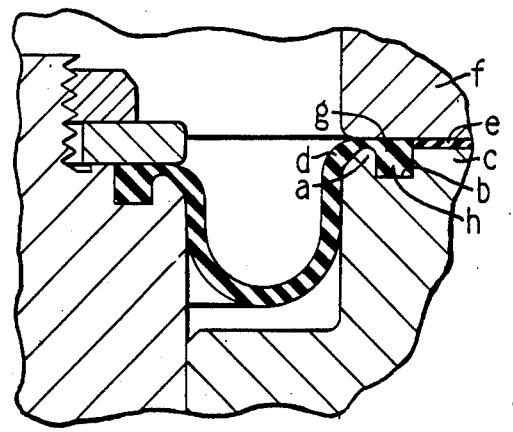
FIG. 1 is a partial, sectional view showing a conventional diaphragm-type piston clamping arrangement according to present-day practice.
Figure 2:
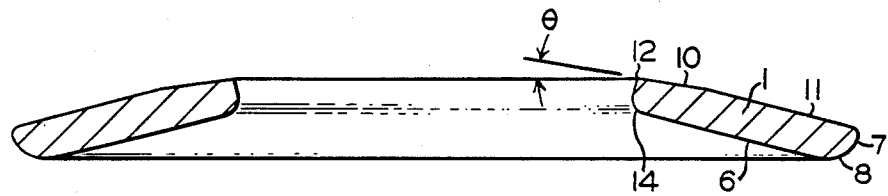
FIG. 2 is a sectional view of a spring washer which provides the diaphragm-clamping means according to the present invention.
Figure 3:
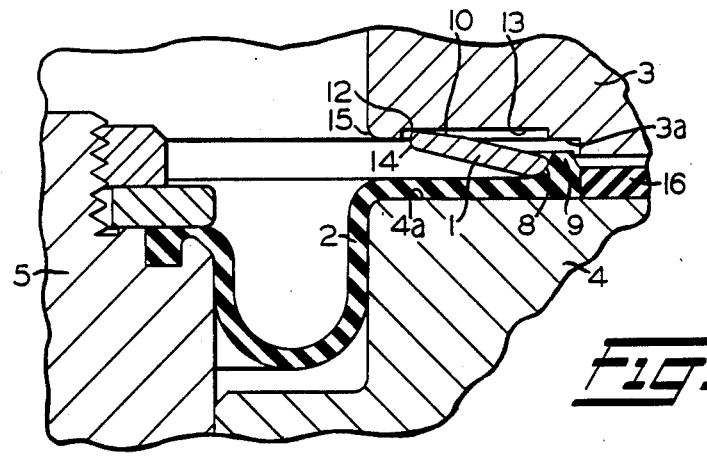
FIG. 3 is a partial, sectional, assembly view showing the spring washer of FIG. 2 in its free state prior to clamping together of the adjoining plate members between which the diaphragm piston is to be clamped.
Figure 4:
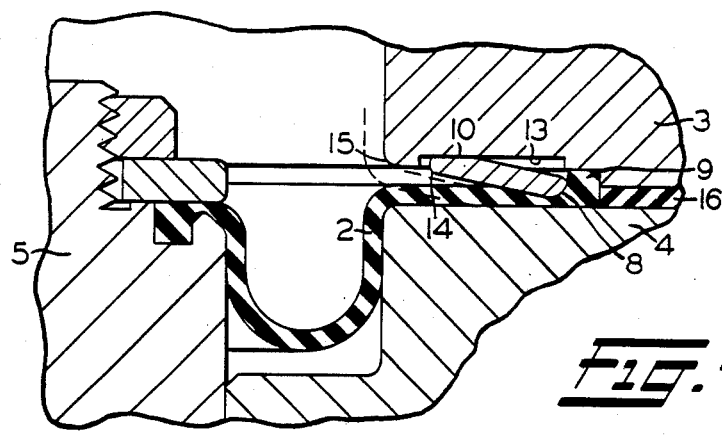
FIG. 4 is a partial, sectional, assembly view showing the spring washer of FIG. 2 in its compressed state following clamping together of the adjoining plate members.

Referring to FIG. 2, there is shown a spring washer 1 having a generally frusto-conical shape, and exhibiting a spring characteristic similar to that of a conventional Belleville-type spring. Spring washer 1 is employed in the present invention as a diaphragm-clamping device for securing the periphery of a diaphragm 2 in place between diaphragm-clamping faces 3a and 4a of adjoining plate members 3 and 4, as shown in FIG. 4. In FIG. 3, spring washer 1 is shown assembled in its free state between plate member 3 and diaphragm 2 prior to plate members 3 and 4 being joined together. Diaphragm 2 is connected at its inner periphery to piston member 5 in a manner similar to the conventional clamping arrangement of FIG. 1, while the outer portion of diaphragm 2 is set in place on clamping face 4a of plate member 4, which is free of any clamping bead whatsoever. Formed between the underside 6 and lower, outside circumferential edge 7 of spring washer 1, as shown in FIG. 2, is a radius 8, which engages diaphragm 2 at the juncture of the diaphragm and an enlarged end portion 9 thereof. Spring washer 1 is further formed with a flat 10 having a slight angle $\theta$ with the upper side 11, depending upon the degree of deflection that the spring washer is designed to undergo during compression between clamping face 3a and diaphragm 2, as the respective plate members 3 and 4 are joined together. As shown in FIG. 3, the upper, inside circumferential edge 12 of spring washer 1 is initially engageable with an annular recess 13 formed in clamping face 3a of plate member 3, with flat 10 becoming fully seated in the recess 13 when spring washer 1 is deflected under compression between the adjoining plate members 3 and 4, as shown in FIG. 4. Flat 10 is thus effective to relieve stress concentrations that would otherwise exist due to point contact between clamping face 4a and spring washer 1. Recess 13 not only serves to initially locate spring washer 1 in its proper position, but further maintains this position, as the spring washer 1 is deflected by the joining together of plate members 3 and 4. The free state height of spring washer 1 is determined by the axial dimension between the upper, circumferential edge 12 and the lower, circumferential radius 8. This dimension is such that, when plate members 3 and 4 are joined together, the distance between clamping face 3a and diaphragm 2 is less than the free height of spring washer 1. Thus, spring washer 1 is deflected; that is, the height of spring washer 1 is compressed from that of its free state, thereby exerting a clamping force on diaphragm 2 at radius 8. By reason of the smooth contour provided by radius 8, the clamping force by which diaphragm 2 is squeezed against the clamping face 4a of plate member 4 is accomplished without cutting or deforming the diaphragm. Another radius 14 is formed between underside 6 and upper edge 12 of spring washer 1 in order to provide a smooth contour with curvature 15 of plate member 3, against which diaphragm 2 is seated without being cut or otherwise deformed when the diaphragm convolution is inverted, as shown by the dotted lines in FIG. 4.

It will also be noted that enlarged end 9 is of such volume as to be tightly compressed between the clamping faces 3a and 4a of adjoining plate members 3 and 4. This results in the enlarged end 9 effecting a pressure seal with clamping face 3a, while diaphragm 2 effects a pressure seal with clamping face 4a at the point of clamping force exerted by spring washer 1. Consequently, fluid pressure leakage is prevented from occurring from either side of the diaphragm piston past the outer periphery of diaphragm 2. This is of particular significance where space restrictions limit the seating area of gasket 16, so as to render the gasket susceptible to high pressure blowout in the event such leakage past diaphragm 2 should occur.

From the foregoing, it will be apparent that different dimensions between clamping faces 3a and 4a, due to the use of different thicknesses of gasket 16, can be compensated for by simply employing a spring washer 1 having the spring characteristics necessary to provide the desired diaphragm clamping force. Thus, standard-style plate members and diaphragms can be used with either standard gauge gaskets, special, thick gauge gaskets, such as the high-pressure gaskets represented in FIGS. 3 and 4, or even where no gasket at all is required.

Although not shown, it is within the scope of the invention to form recess 13 in plate member 4 instead of in plate member 3, in which case spring washer 1 is simply turned upside-down, and located between plate member 4 and diaphragm 2. Ideally, the enlarged end 9 of diaphragm 2 would then be formed to extend downwardly instead of upwardly, as shown.

Figure 5:
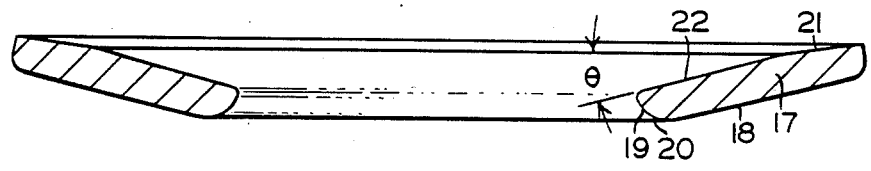
FIG. 5 is a sectional view of a spring washer according to an alternate embodiment of the present invention, in which the spring washer is inverted from the embodiment of FIG. 2.
Figure 6:
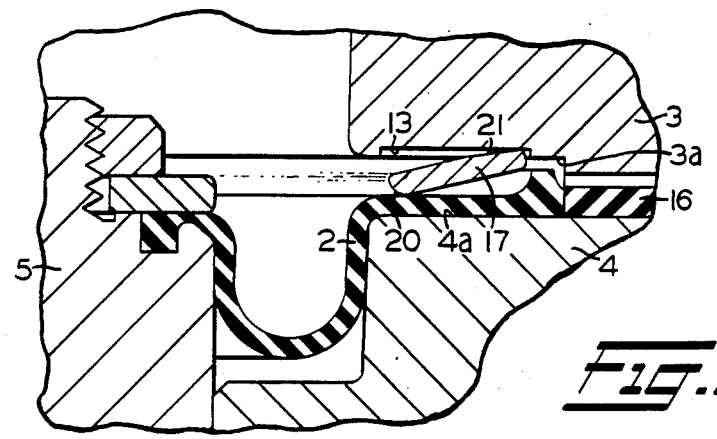
FIGS. 6 and 7 are partial, sectional, assembly views showing the inverted spring washer of FIG. 5 in a free state prior to final assembly and in a compressed state following assembly, respectively.
Figure 7:
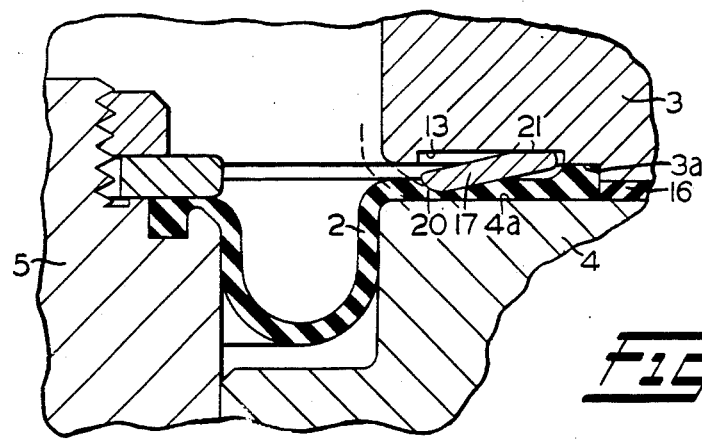

It will be noted, from the foregoing, that the spring washer shown in FIG. 2 effects a clamping force on diaphragm 2 at a location substantially near the outer periphery edge of diaphragm 2, whereas conventional clamping methods provide the clamping at a point closer to the diaphragm convolution, as can be seen from FIG. 1. The location of the clamping point using a spring washer, according to the present invention, can be made to approximate that of conventional clamping arrangements by employing a spring washer 17, as shown in FIG. 5. This spring washer 17 is an inverted version of the spring washer 1 shown in FIG. 2, thus permitting use of the inner periphery of the spring washer to clamp the diaphragm, as opposed to the outer periphery in the FIG. 2 version. As shown in FIGS. 6 and 7, the clamping arrangement, using this version spring washer 17, locates the clamping point further inboard from the clamping point in the FIG. 2 version of spring washer 1, so as to more closely assimilate a conventional clamping arrangement. As can be seen in FIG. 6, spring washer 17 is shown assembled in its free state between plate member 3 and diaphragm 2 prior to plate members 3 and 4 being joined together. Diaphragm 2 is connected at its inner periphery to piston member 5 in a manner similar to the conventional clamping arrangement of FIG. 1, while the outer portion of diaphragm 2 is set in place on clamping face 4a of plate member 4. Formed between the underside 18 and lower, inside circumferential edge 19 of spring washer 17 is a radius 20, which forms a smooth curve at the point of engagement of spring washer 17 with diaphragm 2. Spring washer 17 is further formed with a flat 21 having a slight angle $\theta$ with the upper side 22 of spring washer 17. As shown in FIG. 6, the upper, outside circumferential edge of spring washer 16 is initially engageable with annular recess 13 formed in clamping face 3a of plate member 3, with flat 21 becoming fully seated in the recess when spring washer 17 is deflected under compression between adjoining plate members 3 and 4, as shown in FIG. 7. Flat 21 is thus effective to relieve stress concentrations that would otherwise exist due to point contact between clamping face 4a and spring washer 17. As spring washer 17 is compressed from its free height in the joined position of plate members 3 and 4, a clamping force is exerted on diaphragm 2 by spring washer 17 at the point where radius 20 engages diaphragm 2. Since radius 20 is formed at the lower, inside circumferential edge of spring washer 17, as opposed to radius 8 at the lower, outside circumferential edge of spring washer 1, it will be apparent that the clamping point provided by this inverted spring washer 17 is located in substantially the same position as the conventional clamping bead (a) shown in FIG. 1.

As in the case of spring washer 1, this inverted spring washer 17 may also be located between diaphragm 2 and plate member 4, if it is desired to provide recess 13 in plate member 4 instead of plate member 3. In such an arrangement, of course, enlarged end 9 of diaphragm 2 would extend downwardly instead of upwardly, and would serve the purpose of providing a high-pressure seal around spring washer 1, as explained heretofore.

Having now described the invention, what we claim as new and deisre to secure by Letters Patent, is:

1. A clamping arrangement for securing a diaphragm between adjoining plate members, comprising:
    (a) a first diaphragm-clamping face formed on one of said adjoining plate members;
    (b) a second diaphrabm-clamping face formed on the other of said adjoining plate members, one of said first and second clamping faces having an annular recess formed therein and being in spaced-apart, face-to-face relationship with the other of said first and second clmaping faces between said adjoining plate members;
    (c) a diaphragm member having at least one peripheral end portion disposed between said first and second clamping faces, said at least one peripheral end portion including an enlarged end having opposing faces engageable with said first and second clamping faces at a location beyond said annular recess to provide a seal between said adjoining plate members; and
    (d) an annular spring member having an inner peripheral edge and outer peripheral edge axially displaced relative to said inner peripheral edge, one of said inner and outer peripheral edges being engageable with said one of said clamping faces within said recess and the other of said inner and outer peripheral edges being engageable with said diaphragm member to urge said diaphragm member into engagement with the other of said clamping faces under tension, when said plate members are clamped together.

2. A diaphragm-clamping arrangement, as recited in claim 1, wherein said annular spring member is frusto-conical in cross-section.

3. A diaphragm-clamping arrangement, as recited in claim 1, wherein said inner peripheral edge of said spring member is engageable with said diaphragm member and said outer peripheral edge of said spring member is engageable with said one of said clamping faces within said annular recess.

4. A diaphragm-clamping arrangement, as recited in claim 3, wherein on of said peripheral edges of said spring member is formed with a radius.

5. A diaphragm-clamping arrangement, as recited in claim 3, wherein said outer peripheral edge of said spring member that is engageable with said diaphragm is formed with a radius.

6. A diaphragm-clamping arrangement, as recited in claim 1, whrein said inner peripheral edge of said spring member is engageable with said diaphragm member and said outer peripheral edge of said spring member is engageable with said one of said clamping faces within said annular recess.

7. A diaphragm-clamping arrangement, as recited in claim 6, wherein said one of said peripheral edges of said spring member is formed with a radius.

8. A diaphragm-clamping arrangement, as recited in claim 6, wherein said inner peripheral edge of said spring member that is engageable with said diaphragm is formed with a radius.

9. A diaphragm-clamping arrangement, as recited in claim 1, wherein one surface of said spring member includes a flat having an angle with said one surface on which said spring member is engageable with said recess when said spring member is compressed.

10. A diaphragm-clamping arrangement, as recited in claim 9, wherein a surface of said spring member opposite said flat is formed with a radius.

11. A diaphragm-clamping arrangement, as recited in claim 1, wherein the other of said inner and outer peripheral edges of said spring member is engageable with said diaphragm member at the juncture of said diaphragm member and said enlarged end thereof.

12. A diaphragm-clamping arrangement, as recited in claim 11, wherein said other peripheral edge of said spring member is formed with a radius.

13. A diaphragm-clamping arrangement, as recited in claim 1, wherein the other of said inner and outer peripheral edge of said spring member is engageable with said diaphragm member at a location removed from the juncture between said diaphragm member and said enlarged end thereof.

14. A diaphragm-clamping arrangement, as recited in claim 13, wherein said other peripheral edge of said spring member is formed with a radius.

15. A diaphragm-clamping arrangement, as recited in claim 1, wherein the axial dimension between said inner and outer edges of said spring member in the free state thereof is greater than the dimension between said diaphragm at said at least one peripheral edge portion thereof and said one of said clamping faces.

* * * * *

UNITED STATES PATENT AND TRADEMARK OFFICE
CERTIFICATE OF CORRECTION

PATENT NO. : 4,666,166
DATED : May 19, 1987
INVENTOR(S) : James E. Hart, Michael T. Zoric & Allen W. Kyllonen It is certified that error appears in the above-identified patent and that said Letters Patent are hereby corrected as shown below:

Column 5, claim 1(b), line 27, delete "diaphrabm-clamping"

and insert --diaphragm-clamping--

Claim 3, line 57, delete "inner" and insert --outer--

Column 6, Claim 3, line 2, delete "outer" and insert --inner--

Claim 4, line 6, delete "on" and insert --one--

Signed and Sealed this

Twenty-second Day of December, 1987

Attest:

DONALD J. QUIGG

*Attesting Officer*   *Commissioner of Patents and Trademarks*